July 7, 1959 — W. F. CLAUSSEN — 2,893,895
METHOD OF VAPOR COATING
Filed May 4, 1956
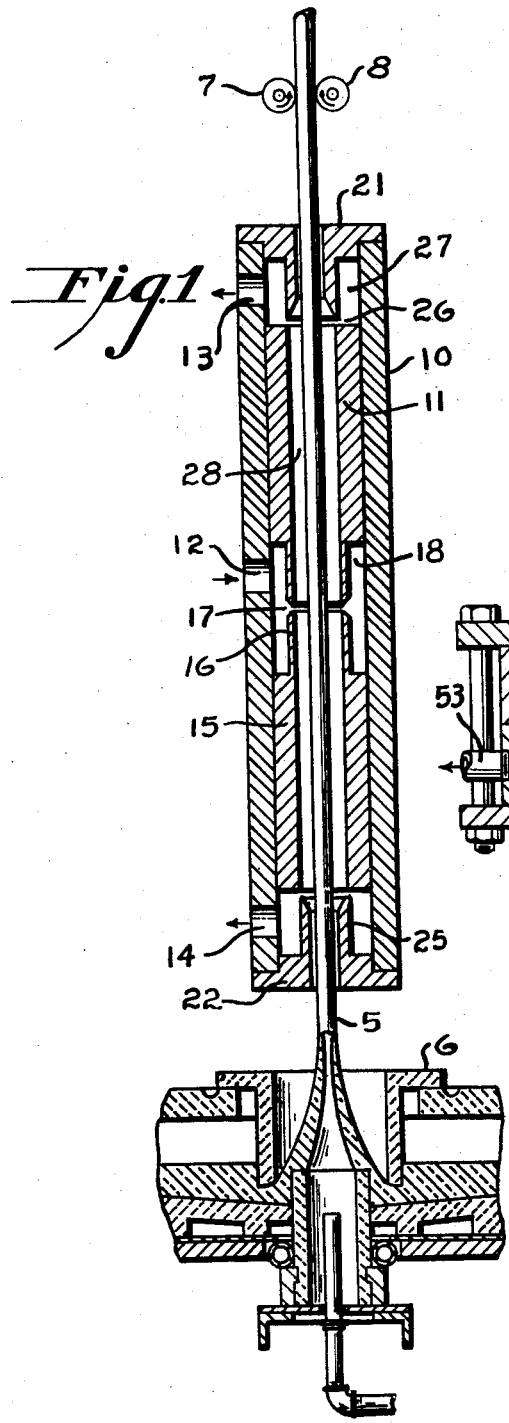
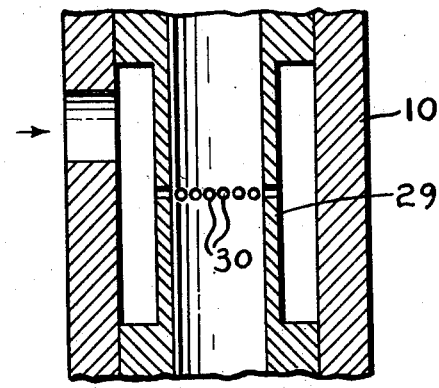
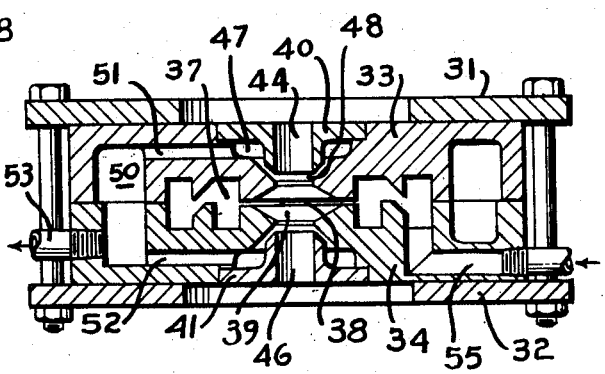
INVENTOR.
WALTER F. CLAUSSEN
BY Clarence R. Patty, J.
ATTORNEY

United States Patent Office 2,893,895
Patented July 7, 1959

2,893,895

METHOD OF VAPOR COATING

Walter F. Claussen, Corning, N.Y., assignor to Corning Glass Works, Corning, N.Y., a corporation of New York Application May 4, 1956, Serial No. 582,772

3 Claims. (Cl. 117—106)

The present invention relates to the formation of electrical resistance elements by the application of an electroconductive coating of tin oxide or the like to a linear body, such for example as a glass rod or tube. The invention is in the nature of an improvement of a system shown and described in an application of Edward M. Griest, Serial No. 389,205, filed October 30, 1953, and in British Patent No. 775,506.

In the system of the aforesaid application a linear glass body issuing from a parent supply body of molten glass passes through a tube passage into near one end of which coating vapors are introduced. Any undeposited materials are drawn from the passage near its other end. Because of the necessary clearance between the body and the wall of the passage air can enter it and to some extent dilute the coating vapors.

According to the present invention the coating vapors are introduced into the passage at a point intermediate its ends and additional passages for the drawing off of the undeposited material are arranged in regions between such intermediate point and the ends of the passage. With such an arrangement any air entering the passage ends joins the undeposited vapors at the end of the coating zone and is drawn off therewith, and therefore, dilution of the coating vapor materials in the region of the passage in which coating is effected cannot occur. As will be evident, with such an arrangement the fumes may be introduced at any desired velocity, the only requirement being that the suction pressures be raised sufficiently to prevent undeposited fumes from issuing from the passage ends into the room rather than through the exhaust passages as intended. Also according to the invention an alternative form of structure may be provided affording a particularly short path through which a body may be passed to better enable an extremely thin uniform coating to be applied.

For a better understanding of the invention reference is had to the accompanying drawing in which:

Fig. 1 illustrates one of two similar vertical sections constituting a cylindrical housing embodying the invention in combination with a glass tube updraw machine, also shown in section, with tubing issuing therefrom.

Fig. 2 is a sectional view of a fragment of Fig. 1 on an enlarged scale and illustrating a slight modification of the structure.

Fig. 3 is a sectional view corresponding to that of Fig. 1 of an alternative form of structure.

Referring particularly to Fig. 1, glass tubing 5 issuing from an updraw machine 6, under the influence of drawing rolls 7 and 8, is passed through a housing 10. For convenience of placing the housing about rod or tubing being drawn or for removing it from thereabout, it may comprise two axially separable sections as in the Griest structure. For the sake of simplification, however, housing 10 is shown as comprising a plain tubular body having a fume inlet port 12 intermediate its ends and fume outlet ports 13 and 14 near its ends. Tightly fitting within the housing 10 are two like tubular bushings 11 and 15 having thin wall sections such as 16 whose ends face one another and are spaced to form a thin annular slot 17 between their ends. Such slot serves as an inlet passage from an annular chamber 18 formed about the thin walls of bushings 11 and 15 and bridging the fume input port 12 through the housing wall. Housing end members 21 and 22 each have tubular wall portions such as 25 projected into the housing bore and terminating a short distance from the adjacent ends of bushings 11 and 15 to form fume exhaust slots such as 26 in communciation with annular chambers such as 27 through which undeposited coating fumes may be withdrawn via the ports 13 and 14. As will be evident, with this arrangement of parts, any air that enters the housing along with the linear body 5 is drawn out with the undeposited fumes and therefore cannot enter the coating area 28 which is localized in the region between the respective exhaust slots.

If desired the structure of Fig. 1 may be modified, as illustrated in Fig. 2, by substituting a single sleeve 29 for sleeves 11 and 15. Sleeve 29 is provided with an annular row of apertures 30 providing coating inlet passages in lieu of a single inlet slot such as 17 of Fig. 1.

The alternative form of structure shown in Fig. 3 is especially suitable for use in applying an extremely thin uniform coating and embodies annular end plates 31 and 32 between which complementary parts 33 and 34 are sandwiched.

Parts 33 and 34 when fitted together form an annular chamber 37 having an inner annular slot 38 in communication with a chamber 39 also jointly formed by parts 33 and 34. Suitably set tightly into recesses in parts 33 and 34 are inserts 40 and 41.

The respective inserts 40 and 41 have cylindrical bores 44 and 46 in register with the chamber 39 and jointly therewith provide a cylindrical passage for accommodating a linear body to be coated while passing therethrough.

Each of the inserts jointly with the associated part 33 or 34 forms an annular chamber such as 47 about its bore and an annular slot such as 48 extending between the cylindrical passage and annular chamber 47. The annular chambers such as 47 are in communication with an outer annular chamber 50, formed jointly by parts 33 and 34, via passages 51 and 52. An exit passage for undeposited coating materials from chamber 50 is provided by a pipe 53 threaded into in part 34. A passage 55 is provided in part 34 for the introduction of coating material into the chamber 39 via chamber 37.

As will be appreciated, as in the structure of Fig. 1, the tube coating region is restricted to that portion of the tube passage that is between the exhaust slots and accordingly any air entering the ends of such passage ends is withdrawn therefrom with the undeposited vapors and therefore is prevented from diluting the coating vapors that are in the region of the passage in which coating is taking place.

What is claimed is:

1. The method of externally coating a linear body which includes moving such body in a direction parallel to its linear dimension through a tubular space, subjecting the body to a vaporous coating material by directing such a material into a region of such space intermediate its ends and exhausting some of such material from such space in regions between the region of introduction of such material thereinto and the ends of such space whereby any air entering the ends of such space about the body is diverted from such space with the exhausted material.

2. A method such as defined by claim 1 which includes introduction of the vaporous material into such space in an annular stream.

3. A method such as defined by claim 1 which includes introduction of the vaporous material into such space in an annular row of streams.

References Cited in the file of this patent

UNITED STATES PATENTS

| | | |
|---|---|---|
| 2,285,017 | Christensen | June 2, 1942 |
| 2,500,801 | Church | Mar. 14, 1950 |
| 2,699,415 | Nachtman | Jan. 11, 1955 |
| 2,778,743 | Bowman | Jan. 22, 1957 |
| 2,810,365 | Keser | Oct. 22, 1957 |